(No Model.)

W. SECHRIST.
VALVE GEAR.

No. 443,463. Patented Dec. 23, 1890.

Witnesses
F. T. Chapman.
Will Marks.

Inventor
William Sechrist
By his Attys
Hallock & Hallock

UNITED STATES PATENT OFFICE.

WILLIAM SECHRIST, OF ERIE, PENNSYLVANIA, ASSIGNOR OF ONE-HALF TO LEONARD D. DAVIS, OF SAME PLACE.

VALVE-GEAR.

SPECIFICATION forming part of Letters Patent No. 443,463, dated December 23, 1890.

Application filed September 18, 1890. Serial No. 365,435. (No model.)

*To all whom it may concern:*

Be it known that I, WILLIAM SECHRIST, a citizen of the United States, residing at Erie, in the county of Erie and State of Pennsylvania, have invented certain new and useful Improvements in Valve-Gears for Steam-Engines; and I do hereby declare the following to be a full, clear, and exact description of the invention, such as will enable others skilled in the art to which it appertains to make and use the same.

This invention relates to the valve-gears of steam-engines; and it consists in certain improvements in the reversing mechanism, as will be hereinafter fully described, and pointed out in the claims.

The object of my invention is to produce a reversing mechanism which is compact and mounted wholly on the engine-shaft, easily operated and adjustable, and by which the cut-off of the engine can be maintained or varied at will without difficulty.

Figure 1:
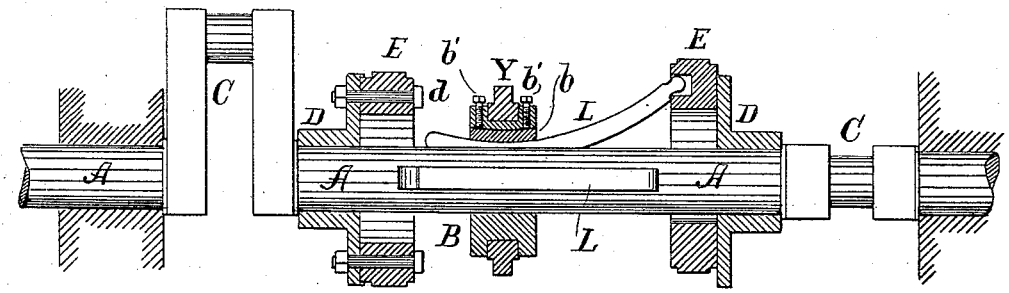
Figure 2:
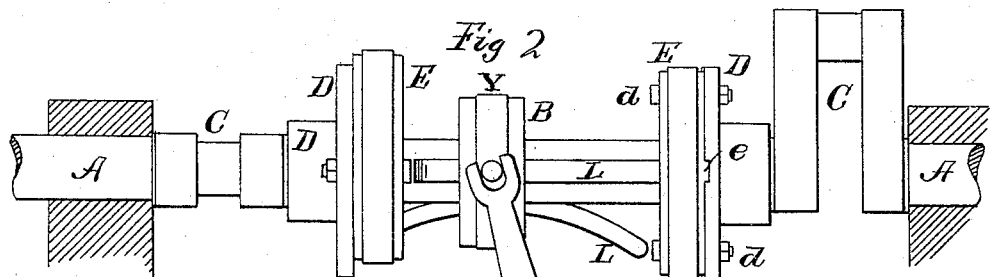
Figure 3:
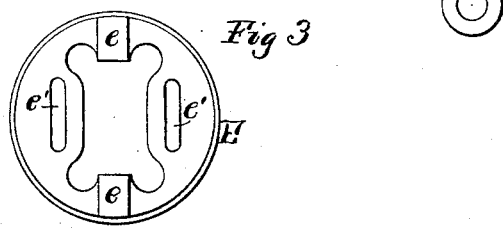

The device is illustrated in the accompanying drawings, as follows:

Figure 1 is a plan view of the engine-shaft with parts of the valve-gear in horizontal section. Fig. 2 is a like view with all the parts in elevation, the cranks being in different position from those in Fig. 1. Fig. 3 is a side elevation of one of the eccentrics, the side shown being that next to the crank.

The invention is shown applied to the crank-shaft of a duplex engine; but it will be easily understood that it may be applied to a single-acting engine.

In the drawings, A marks the crank-shaft of the engine; C, the cranks; D, the disks, which are fixed to the shaft; E, the eccentrics, which are shiftable and sustained by the disks. The means for shifting the eccentrics constitute the essential features of my invention, and they consist of the rocking arc-formed levers L, the sliding collar B, and the appliances for shifting said collar. The arc-formed levers L are seated in grooves cut in the shaft and are placed with their convex sides next to the shaft. They are both embraced by the sliding collar, which embraces the shaft also, and as this collar is shifted the levers are rocked. Each lever engages one of the eccentrics, and as they are rocked by the sliding collar the eccentrics are simultaneously shifted across the shaft.

The manner of connecting the eccentrics to the levers is optional. I have shown them engaged by the end of the lever being inserted in a mortise in the side of the eccentric. I do not wish to be confined to any particular manner of making this connection, as many constructions will readily suggest themselves to a mechanic.

In the collar B where it bears on the levers I prefer to place a bearing-block $b$, which can be adjusted properly by set-screws $b'$. The means for shifting the collar B may be varied. I show a yoke Y and shifting-lever S.

The eccentrics E may be mounted on the disks D in various ways. I show a spline and groove $e$ and bolts $d$, which pass through slots $e'$ in the eccentrics.

A movement of the collar B across the middle line of its traverse will shift the eccentrics across the middle line of their traverse, and thus reverse the engine. Any movement of the collar from the middle line of its traverse toward either end thereof will extend the cut-off and increase the speed of the engine, and vice versa. Resting the collar on the middle line of its traverse will stop the engine. If the shifting-lever is moved to a given point and secured there, the cut-off incident to that position of parts will be maintained.

It will be seen that all the effects of the common link-movement are obtained by my device and that the apparatus is far more compact, and it is cheaper to build.

What I claim as new is—

1. In the valve-gear of a steam-engine, the combination, with a diametrically-shifting eccentric, of an arc-shaped lever connected at one end with said eccentric and extending longitudinally along the shaft with its convex side next to the shaft, and a longitudinally-shifting collar which embraces the said shaft and lever.

2. In the valve-gear of a steam-engine, the combination, with a diametrically-shifting eccentric, of a lever attached to said eccentric and extending therefrom along the shaft, and a longitudinally-shifting collar embracing said lever and shaft.

In testimony whereof I affix my signature in presence of two witnesses.

WILLIAM SECHRIST.

Witnesses:
JNO. K. HALLOCK,
WM. P. HAYES.